United States Patent [19]

Fenoglio et al.

[11] Patent Number: 4,895,928

[45] Date of Patent: Jan. 23, 1990

[54] MELT-PROCESSABLE POLYMERIC MATERIALS BASED ON 5-T-BUTYLISOPHTHALIC

[75] Inventors: David J. Fenoglio; Edward E. Paschke, both of Wheaton; James R. Stephens, Naperville, all of Ill.

[73] Assignee: Amoco Corporation, Chicago, Ill.

[21] Appl. No.: 208,398

[22] Filed: Jun. 17, 1988

Related U.S. Application Data

[63] Continuation of Ser. No. 904,907, Sep. 8, 1986, abandoned.

[51] Int. Cl.[4] .................... C08G 69/46; C08G 69/32
[52] U.S. Cl. ..................... 528/348; 264/DIG. 61; 528/176; 528/183; 528/337; 528/347; 528/349
[58] Field of Search ............... 528/349, 348, 347, 337, 528/183

[56] References Cited

U.S. PATENT DOCUMENTS

| | | | |
|---|---|---|---|
| 2,715,620 | 8/1955 | Carlston et al. | 260/78 |
| 3,063,966 | 11/1962 | Kwolek et al. | 260/78 |
| 3,354,127 | 11/1967 | Hill et al. | 260/78 |
| 3,408,334 | 10/1968 | Caldwell et al. | 260/78 |
| 3,426,001 | 2/1969 | Ridgway | 528/349 |
| 4,042,750 | 8/1977 | Hanson et al. | 528/349 |
| 4,057,536 | 11/1977 | Jones | 260/78 R |

*Primary Examiner*—Harold D. anderson
*Attorney, Agent, or Firm*—Reed F. Riley; William H. Magidson; Ralph C. Medhurst

[57] ABSTRACT

Melt-processable polyaramide and polyarylate polymers and copolymers are made employing a component containing the 5-t-butylisophthaloyl moiety and aromatic diamines or aromatic diols. The melt processability of these polymers can eliminate expensive processing in making shaped articles. The claimed materials are useful for making fiber, film, laminates, coatings, adhesives and molded objects.

24 Claims, No Drawings

MELT-PROCESSABLE POLYMERIC MATERIALS BASED ON 5-T-BUTYLISOPHTHALIC

This is a continuation of application Ser. No. 904,907, filed Sept. 8, 1986, now abandoned.

BACKGROUND OF THE INVENTION

This invention relates to polymeric materials based on 5-t-butylisophthalic acid which are melt-processable and, more particularly, to polyaramide and polyarylate polymers and copolymers based on a compound containing the 5-t-butylisophthaloyl moiety and partially or wholly aromatic diamines or diols, which polymers and copolymers have the excellent thermal and mechanical properties of polymeric materials of these structure types and also, because of their amorphous nature and substantial processing temperature window, can be melt-processed into various shaped article forms such as fibers, films, coatings and molded objects.

Among the most important synthetic polymers are polyesters and polyamides. These polymers exhibit a wide range of desirable chemical and physical properties. Within these two broad categories are (1) polyarylates, polyesters made using aromatic diacids and aromatic diols or their derivatives, and (2) polyaramides, polyamides made from aromatic diacids and aromatic diamines or their derivatives. Both of these classes of polymers are considered engineering polymers. In the case of polyaramides, which generally have superior thermal and other physical properties, for example, Nomex and Kevlar, the polymers are not commercially melt-processable and often are only soluble in corrosive solvents such as sulfuric acid, from which fibers may be spun. Many polyaramides also have extremely high softening points, often above 400° C., and are thermally unstable in the melt. Some polymers and copolymers of these two classes incorporating the diacyl functionality of 5-t-butylisophthalic acid or its derivatives are reported in the patent literature. Now it has been found that by combining a monomer containing the 5-t-butylisophthaloyl moiety, alone or in combination with other diacyl moieties, with a wholly or partially aromatic diamine or diol monomer, amorphous polyaramides or polyarylates which have a substantial processing temperature window are produced. Such a finding can lead to less expensive fibers, films, coatings and molded objects which have the same or better physical properties than, e.g., Nomex, a commercial polymer made from isophthalic acid and m-phenylenediamine which is not commercially melt-processable.

An extensive patent literature exists for polyaramides and polyarylates, including those which contain the t-butylisophthaloyl moiety. In U.S. Pat. Nos. 2,715,620 and 2,794,794, a compound containing the 5-t-butylisophthaloyl moiety is used with aliphatic diamines and diols of between 5 and 10 carbon atoms to make polyamides and polyesters with improved heat resistance as compared to polymers made using the isophthaloyl moiety. Wholly aromatic polyamides are taught by Hill in U.S. Pat. No. 3,094,511 and Kwolek in U.S. Pat. No. 3,063,966, and the list of useful aromatic diacids includes lower alkyl 5-substituted isophthalic acids and diamines such as m- and p-phenylenediamines. In U.S. Pat. No. 3,408,334, Example 13 teaches a polyaramide made from the 5-t-butylisophthaloyl moiety and 4,4'-oxybisaniline which is said to be useful as a fiber. Hanson et al. in U.S. Pat. No. 4,042,750 teach polyamides and shaped articles made from the polyamides. Example III of that patent discloses the formation of a polyaramide made from 5-t-butyl-isophthalic acid and methylenebisaniline.

Polyarylates and copolyarylates made from a large number of aromatic diacids and aromatic diols including the 5-t-butylisophthaloyl moiety and bisphenol A are taught in, e.g., U.S. Pat. Nos. 3,546,165, 3,684,766 and 4,102,864.

SUMMARY OF THE INVENTION

Described herein are amorphous, melt-processable polyaramides and polyarylates having an intrinsic viscosity greater than about 0.5 made by employing a basic component containing at least one partially or wholly aromatic diamine or diol and a diacyl compound-containing component comprising about 20 mol percent or more of a compound containing the 5-t-butylisophthaloyl moiety. Also described are shaped articles such as films, fibers, coatings, and molded articles made from such novel polyaramides and polyarylates by melt-processing.

DETAILED DESCRIPTION OF THE INVENTION

In preparing the polymers of this invention, an acidic component containing a compound containing the 5-t-butylisophthaloyl moiety is employed. Additional compounds containing other aromatic diacyl moieties can also be used in admixture with the compound containing the 5-t-butylisophthaloyl moiety. Such materials are compounds containing the diacyl moieties of isophthalic acid, terephthalic acid and the like and aliphatic diacyl moieties such as that of adipic acid and the like. When another compound or compounds containing the diacyl moiety is used in admixture with the compound containing the 5-t-butylisophthaloyl moiety, amounts up to about 80 mol percent of this other compound or compounds, more preferably, up to about 50 mol percent, and most preferably up to about 20 mol percent, can be used to obtain the novel combination of properties of polymers and copolymers of the instant invention. Normally, it is preferred that the compound or compounds containing the diacyl moiety be in the form of the acyl chloride.

Exemplary diamines which may be utilized as the basic component for the preparation of the polyamides of this invention include meta-phenylenediamine and lower alkyl-substituted meta-phenylenediamines such as methyl-, ethyl-, propyl-, etc., meta-phenylenediamine. There may be more than one alkyl group attached to the aromatic ring as in the case of dimethyl, trimethyl, tetramethyl, diethyl, triethyl, and triisopropyl meta-phenylenediamine. The alkyl substituent groups need not be the same because compounds such as 2-methyl-4-ethyl-meta-phenylenediamine and 2-methyl-4-ethyl-5-propyl meta-phenylenediamine may be utilized. In place of an alkyl group, the aromatic ring may be substituted with one or more lower alkoxy groups such as, for example, methoxy-, ethoxy-, propoxy-, butoxy-, etc., meta-phenylenediamine. Other representative aromatic diamines which may be utilized include dimethoxy, trimethoxy, tetramethoxy, and diethoxy meta-phenylenediamine, and 2-methoxy-4-ethoxy meta-phenylenediamine. Halogen-substituted meta-phenylenediamines as exemplified by chloro- and bromo-meta-phenylenediamine may be utilized. Other meta-phenylenediamines which may be used include the lower carbalkoxy meta-phenylenediamines. One or more of the latter groups may be attached to the aromatic nucleus along with one or more alkyl, alkoxy, or halogen groups so long as the total number of carbon atoms in the substituents attached to an aromatic ring does not exceed nine. Where more than one substituent group is attached to an aromatic ring, best results are obtained with alkyl and alkoxy groups.

In addition to meta-phenylenediamine and the substituted meta-phenylenediamines specified above, the corresponding unsubstituted and substituted para-phenylenediamine compounds may also be used. There may be one or more of a combination of substituents attached to the aromatic ring so long as the total number of carbon atoms in all substituents attached to an aromatic ring does not exceed nine.

In addition to the single-ring aromatic diamines specified above, multiple- or fused-ring aromatic diamines of the following formula are also useful in this invention.

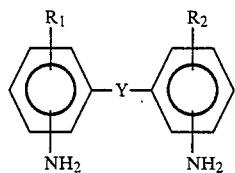

Examples of such compounds are 4,4'-oxybisaniline, 4,4'-sulfonylbisaniline, 4,4'-methylenebisaniline, 4,4'-thiobisaniline, 4,4'-diphenyldiamine, 3,3'-oxydiphenyldiamine, 3,3'-sulfonyldiphenyldiamine, and 3,3'-diphenyldiamine, and the corresponding compounds in which one or both of the aromatic rings contains one or more or a combination of lower alkyl, lower alkoxy, halogen, and lower carbalkoxy groups and the total number of carbon atoms attached to the aromatic ring does not exceed nine.

Preferred aromatic diamines are m-phenylenediamine, p-phenylenediamine, 4,4'-oxybisaniline, 4,4'-thiobisaniline, and 4,4'-sulfonylbisaniline. Most preferred is m-phenylenediamine.

Mixtures of any of these diamines may also be used in any molar proportions.

Exemplary diols which may be utilized as the basic component for the preparation of the polyarylates of this invention include resorcinol, hydroquinone, 3,3'-, 3,4'- and 4,4'-diphenols, and diphenols represented by the formula:

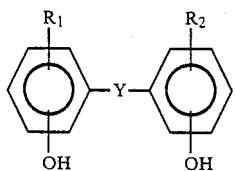

wherein Y is not present, O, S, $SO_2$, $C_1$ to $C_3$ alkylene or $C_2$ to $C_{13}$ alkylidene, and $R_1$ and $R_2$ are H, a $C_1$ to $C_4$ alkyl or alkoxy radical, Cl or Br. The preferred diphenols include bis(4-hydroxyphenyl)methane, 1,1-bis(4-hydroxyphenyl)ethane, 4,4'-diphenyldiamine, 2,2-bis(4-hydroxyphenyl)propane, bis(4-hydroxyphenyl)ether, bis(4-hydroxyphenyl)sulfide and bis(4-hydroxyphenyl)sulfone. Of these, 2,2'-bis(4-hydroxyphenyl)-propane is most preferred.

Polymers of the instant invention can be prepared by any convenient method known in the art such as melt condensation, solution polymerization, interfacial polymerization, etc., as may be understood by one skilled in the art. Normally, approximately equimolar proportions of the diacyl component and diamine component are employed. Since it is preferred to use the diacyl component in the form of a diacyl chloride, it is important to free the resulting polymer from chloride impurities. Ways of accomplishing this, such as adding propylene oxide to the reaction mixture and washing the polymer well, are well known to those skilled in the art.

Polymer blends made from two or more polyaramide or polyarylate polymers or copolymers of the instant invention can be employed. For example, a blend of poly(m-phenylene-5-t-butylisophthalamide) and poly(p-phenylene-5-t-butylisophthalamide) can be used. Polymer blends in any molar proportions from 1 to 99 mol percent are utilizable in this invention. In addition, the polyamides and polyarylates of this invention containing the 5-t-butylisophthaloyl moiety may be blended with other polymers and copolymers such as polyamides including nylon 6,6 and nylon 6, polyaramides including Nomex, polyarylates, polysulfones, polyether sulfones, polyarylether ketones, polyamide-imides, polyether-imides, polyolefins and the like.

Polymers and copolymers of the instant invention can be filled with either inorganic or organic fillers such as carbon fiber, glass fiber or beads, talc, etc. Amounts of fillers which can be added are from about 10 to about 50 weight percent of the polymeric material.

The weight average molecular weight of the polymers for adequate commercial performance is preferably at least a value corresponding to an intrinsic viscosity (i.v.) of about 0.5. More preferably, the weight average molecular weight is at least a value corresponding to an i.v. of about 0.8. I.V. values are conveniently measured at 0.4 weight percent and 30° C. in N,N'-dimethylacetamide for polyaramides and in a 3/2 mixture of phenol and sym-tetrachloroethane for polyarylates.

Polymers and copolymers of this invention are amorphous, i.e., they do not have a crystalline melting point by thermal analysis. They have the necessary thermal stability above their Tg value leading to melt processability which when combined with other excellent physical properties of the instant polymers is a novel and useful combination of properties for polymers of this structure type.

The densities of the polymers and copolymers of this invention are lower than might be expected from other similar-in-structure polymeric materials, due apparently to the pendant t-butyl group.

The polymers of this invention find application in a large variety of physical shapes and forms. Among the most significant of these forms are fibers, films, molded objects, coatings, laminates and adhesives. Processes for molding and spinning of polymers and copolymers are well known to those skilled in the art as is the use of a controlled inert atmosphere in certain of such operations. Processes for making laminates, coatings and adhesives are also well-known to those skilled in the art.

In fiber form, the polymers of this invention may be used for high-temperature heat and electrical insulation, protective clothing and curtains, filtration media, packing and gasketing materials, brake linings and clutch facings. In the aircraft industry, these materials can be used in parachutes, fuel cells, tires, ducts, hoses and insulation. Cordage for tires and conveyor belts, particularly where such materials would be subject to prolonged high-temperature exposure, is another application. Press cloths in the dry cleaning industry prepared from such fibers have extreme hydrolytic stability. In the form of films, these polymers may be used in automotive and aviation interior head lining materials, decorative trim, high-temperature heat and electrical insulation, such as for slot liners, use in dry transformers, capacitors, cable wrappings, etc., packaging of items to be exposed to high-temperature or high-energy radiation while within the package, corrosion-resistant pipe, hot-water pipe, duct work, hot-air ventilation, aircraft body skins, aircraft radomes, embossing roll covers, containers and container linings, printed circuits, tape for hot pipe overwrapping, laminated structures where the films are bonded to metal sheets or foils, mold liners or self-sustaining containers for casting low-melting (below 300° C.) fusible materials, including metals, and a variety of other similar and related uses.

Films formed from polymers of this invention may be stretched or otherwise oriented according to conventional procedures. Films may be oriented biaxially by stretching or rolling in both directions or by rolling in one direction and stretching in the other.

Molded objects may be made by either compression or injection molding and may be used in such applications as the hood of an automobile, a shroud for a lawn mower, a chain saw guard, and electrical connector applications.

The following Examples will serve to illustrate certain specific embodiments of the hereindisclosed invention. These Examples should not, however, be construed as limiting the scope of the novel invention, as there are many variations which may be made thereon without departing from the spirit of the disclosed invention, as those of skill in the art will recognize.

EXAMPLE 1

Poly (m-phenylene-5-t-butylisophthalamide) was made by reacting a cooled solution made from 20 g (0.185 mol) of m-phenylenediamine and 366 g (4.2 mols) of N,N'-dimethylacetamide under nitrogen with 48 g (0.185 mol) of solid 5-t-butylisophthaloyl chloride and maintaining the temperature at 10° C. or less. After complete addition of the acid chloride, the mixture was maintained at 30°–35° C. for 3 hours. The resulting polymer was precipitated and washed with water. After drying, a 99% yield of a white, powdery solid was obtained. The amorphous material had an i.v. of 1.54, as measured in N,N'-dimethylacetamide (0.4 wt.%) at 30° C., a density of 1.1740 g/ml and a Tg of 302° C.

EXAMPLE 2

Poly (4,4'-oxybisphenylene-5-t-butylisophthalamide) was made from 4,4'-oxybisaniline by the procedure of Example 1. After drying, a 99% yield of a white, powdery solid was obtained. The amorphous material had an i.v. of 2.11, as measured in N,N'-dimethylacetamide (0.4 wt.%) at 30° C. and a Tg of 298° C.

EXAMPLE 3

Poly (p-phenylene-5-t-butylisophthalamide) was made from p-phenylenediamine by the procedure of Example 1. After drying, a 99% yield of a white, powdery solid was obtained. The amorphous material had an i.v. of 2.98, as measured in N,N'-dimethylacetamide (0.4 wt.%) at 30° C. and a Tg of 343° C.

EXAMPLE 4

Poly (4,4'-thiobisphenylene-5-t-butylisophthalamide) was made from 4,4'-thiobisaniline by the procedure of Example 1. After drying, a 99% yield of a white, powdery solid was obtained. The amorphous material had an i.v. of 1.65, as measured in N,N'-dimethylacetamide (0.4 wt.%) at 30° C. and a Tg of 286° C.

EXAMPLE 5

Poly (4,4'-sulfonylbisphenylene-5-t-butylisophthalamide) was made from 4,4'-sulfonylbisaniline by the procedure of Example 1. After drying, a 99% yield of white, powdery solid was obtained. The amorphous material had an i.v. of 0.67, as measured in N,N'-dimethylacetamide (0.4 wt.%) at 30° C. and a Tg of 334° C.

EXAMPLE 6

Poly (4,4'-methylenebisphenylene-5-t-butylisophthalamide) was made from 4,4'-methylenebisaniline by the procedure of Example 1. After drying, a 99% yield of a white, powdery solid was obtained. The amorphous material had an i.v. of 1.90, as measured in N,N'-dimethylacetamide (0.4 wt.%) at 30° C. and a Tg of 283° C.

EXAMPLE 7

A copolyaramide was made using a 50:50 mixture of 5-t-butylisophthaloyl chloride and isophthaloyl chloride by reacting 40 g (0.2 mol) of 4,4'-oxybisaniline in 316 g (3.62 mols) of N,N'-dimethylacetamide under nitrogen with a molten mixture of 20.2 g (0.1 mol) of isophthaloyl chloride and 25.8 g. (0.1 mol) of 5-t-butylisophthaloyl chloride at 25°–30° C. After maintaining the mixture at 50° C. for 3 hours, the polymer was precipitated and washed with water. A white, powdery solid was obtained having a solution viscosity of 148 stokes as measured in N,N'-dimethylacetamide (15% solids) at 23° C.

EXAMPLE 8

Poly (4,4'-oxybisaniline-5-t-butylisophthalamide) was made by reacting a solution made from 160.19 g (0.80 mol) of 4,4'-oxybisaniline and 557 g (5.62 mol) of N-methylpyrrolidone under nitrogen with 207.3 g (0.8 mol) of 5-t-butylisophthaloyl chloride while maintaining the temperature between 35° and 40° C. The resulting polymer was precipitated and washed with water. After drying, a 98% yield of a white, powdery solid was obtained. The amorphous material had an i.v. of 0.91, as measured in N-methylpyrrolidone (0.4 wt.%) at 30° C.

EXAMPLE 9

The polymer from 5-t-butylisophthaloyl chloride and a 70:30 mol percent 4,4'-oxybisaniline and meta-phenylenediamine mixture was made by reacting 112.3 g (0.56 mol) of 4,4'-oxybisaniline and 25.95 g (0.24 mol) of meta-phenylenediamine in 723.7 g (7.31 mols) of N-methylpyrrolidone under nitrogen with 207.3 g (0.80 mol) of powdered 5-t-butylisophthaloyl chloride while maintaining the temperature between 35° and 40° C. The mixture was maintained at room temperature for four hous. The resulting polymer was precipitated and washed with water. After drying, a white, powdery solid was obtained. The amorphous material had a Tg of 284° C. an i.v. of 0.86, as measured in N-methylpyrrolidone (0.4 wt.%) at 30° C.

EXAMPLE 10

Poly (2,2'-isopropylidenebis(p-phenylene)-5-t-butylisophthalate) was made from 5-t-butylisophthaloyl chloride and bisphenol A. A solution containing 21.1 g (0.528 mol) of NaOH and 57 g (0.25 mol) of 2,2'-bis(4-hydroxyphenyl)propane in 1500 ml of water was made up in a cooled Waring Blendor. To this solution with mixing was added a cooled solution of 64.75 g (0.25 mol) 5-t-butylisophthalic acid in 750 ml of methylene chloride. The resulting pasty solid was precipitated with 1500 ml of acetone, washed with water and dried at 100° C. in a vacuum oven. The yield of the resulting white powder was 99 g (95%). The solid had an i.v. of 0.99, as measured in a 3/2 mixture of phenol and sym-tetrachloroethane (0.4 wt.%) at 30° C. The Tg of the material was 217° C. and its density was 1.1660 g/cm$^3$. A sample of the material was compression molded into a film which showed 0.2 wt% water absorption at 50% relative humidity and 0.4 wt% water absorption at 100% relative humidity. The polymer along with copolymers containing up to 50 mol percent of isophthalic acid are very soluble to completely soluble in toluene.

EXAMPLE 11

A copolymer was made using a 50/50 mixture of 5-t-butylisophthaloyl chloride and terephthaloyl chloride with bisphenol A. The procedure was the same as in Example 10 except that 1 g of sodium laurylsulfate in 150 ml of water was added to the bisphenol A solution before addition of the mixture of acid chlorides. The approximately 95% yield of white, powdery copolymer had an i.v. of 1.17 and a Tg of 227° C.

EXAMPLE 12

Compression-molded pieces were made and tested as follows. Five-gram samples of polymer were pressed on a Wabash hydraulic press at a block temperature of 350° C. (center) and 320° C. (edges). Pressure on the sample was raised stepwise (20 sec, 500 psi; 20 sec, 1000 psi; 20 sec, 2000 psi; and 90 sec, 7000 psi). Elongation, yield and % break were measured on stamped out Type 5 tensile bars according to ASTM D638 (crosshead speed 0.2 in/min) and the test results from 5 bars were averaged. Tensile test results are shown in Table 1 below.

TABLE 1

| Polymer Type (Example No.) | i.v. Before Molding | Tensile Strength (psi) | Elongation (%) |
|---|---|---|---|
| 1 | 1.92 | 8,960 | 4.11 |
| 7* | | 17,000 | 15 |

*5-inch disks molded in a Watson-Stillman press at 343° C. 3 min/2.5 tons; 2 min/5 tons; 2 min/10 tons; 10 min/25 tons.

EXAMPLE 13

Injection-molded pieces were made and tested as follows. Compression-molded sheet polymer was cut up and ground in a Wiley mill to pass a 20-mesh screen and dried under vacuum at 120° C. overnight. The dried material was injection molded into bars on a CSI Mini-Max molder at 370° C. using a ⅛-inch gauge mold. Residence time and mold temperature were about 15 seconds and 90° C., respectively. Tensile tests were run on the bars at a strain rate of 58%/min, generally within three hours of molding. Tensile test results are shown below in Table 2.

TABLE 2

| Polymer Type (Example No.) | i.v. Before Molding | Tensile Strength (psi) | Elongation (%) |
|---|---|---|---|
| 1 | 1.00 | 8,450 | 6.2 |
| 8$^{1,3}$ | 0.91 | 18,600 | 10.2 |
| 9$^{2,3}$ | | 10,500 | 4.2 |

$^1$Molded at 299° C.
$^2$Molded at 265° C.
$^3$D1708 tensile bars used

EXAMPLE 14

One percent weight-loss temperatures were obtained using thermogravimetric analysis employing a heating rate of 20° C./min. Data were collected for both heating in air and heating in nitrogen. The data given below in Table 3 have been corrected for solvent or moisture losses and are believed to represent exclusively polymer degradation.

TABLE 3

| Polymer Type (Example No.) | i.v. | T at which a 1% weight loss occurs in 1 hour (°C.) |
|---|---|---|
| 1 | 0.92 | 365 |
| 1 | 0.69 | 425* |
| 2 | 2.11 | 351 |
| 2 | 2.11 | 441* |
| 3 | 2.99 | 388 |
| 3 | 2.98 | 425* |
| 4 | 1.65 | 353 |
| 4 | 1.64 | 434* |
| 5 | 0.67 | 374 |
| 5 | 0.67 | 440* |
| 6 | 1.90 | 394 |
| 6 | 1.90 | 446* |

*1% weight-loss temperatures measured in nitrogen

What is clamed is:

1. Melt processing an amorphous polyaramide having an intrinsic viscosity measured on a 0.4 wt.% solution in N,N'-dimethylacetamide at 30° C. larger than about 0.5 made from at least one wholly aromatic diamine and a diacyl compound-containing component containing at least twenty mol (20) percent of a compound containing the 5-t-butylisophthaloyl moiety.

2. The process of claim 1 wherein said diacyl compound-containing component contains at least fifty (50) mol percent of said compound containing the 5-t-butylisophthaloyl moiety.

3. The process of claim 1 wherein said diacyl compound-containing component contains at least eighty (80) mole percent of said compound containing the 5-t-butylisophthaloyl moiety.

4. The process of claim 1 wherein said diamine contains m-phenylenediamine, p-phenylenediamine, 4,4'-oxybisaniline, 4,4'-thiobisaniline, or 4,4'-sulfonyl-bisaniline.

5. The process of claim 1 wherein said diamine contains m-phenylenediamine.

6. The process of claim 2 wherein said diamine contains m-phenylenediamine, p-phenylenediamine, 4,4'-oxybisaniline, 4,4'-thiobisaniline, or 4,4'-sulfonylbisaniline.

7. The process of claim 3 wherein at least one of said at least one diamine is m-phenylenediamine.

8. Melt processing an amorphous polyaramide having an intrinsic viscosity measured on a 0.4 wt. % solution in N,N'-dimethylacetamide at 30° C. larger than about 0.5 made from at least m-phenylenediamine and a diacyl compound component containing at least twenty (20) mol percent of a compound containing the 5-t-butylisophthaloyl moiety.

9. The process of claim 1 in which a fiber is made.

10. The process of claim 1 in which a molded object is made.

11. The process of claim 1 in which a film is made.

12. The process of claim 1 in which a coating is made.

13. The process of claim 2 in which a fiber is made.

14. The process of claim 2 in which a molded object is made.

15. The process of claim 2 in which a film is made.

16. The process of claim 2 in which a coating is made.

17. The process of claim 3 in which a fiber is made.

18. The process of claim 3 in which a molded object is made.

19. The process of claim 3 in which a film is made.

20. The process of claim 3 in which a coating is made.

21. The process of claim 8 in which a fiber is made.

22. The process of claim 8 in which a molded object is made.

23. The process of claim 8 in which a film is made.

24. The process of claim 8 in which a coating is made.

* * * * *